United States Patent
Aly et al.

[11] Patent Number: 5,902,756
[45] Date of Patent: May 11, 1999

[54] CERAMIC MATRIX COMPOSITES WITH INTEGRATED TOPCOAT LAYERS

[75] Inventors: Elsid I. Aly, Grand Prairie; Don Michael Box, Hurst; James Eugene Littlefield, Arlington, all of Tex.

[73] Assignee: Northrop Grumman Corporation, Los Angeles, Calif.

[21] Appl. No.: 08/690,404

[22] Filed: Jul. 25, 1996

[51] Int. Cl.[6] ..................................................... B32B 3/10
[52] U.S. Cl. ...................... 442/239; 442/246; 442/249; 428/141; 264/258
[58] Field of Search ........................... 428/141; 442/239, 442/246, 249; 264/258

[56] References Cited

U.S. PATENT DOCUMENTS

| | | | |
|---|---|---|---|
| 5,173,367 | 12/1992 | Liimatta et al. | 428/408 |
| 5,196,271 | 3/1993 | White et al. | 428/545 |
| 5,208,192 | 5/1993 | Yu et al. | 501/92 |
| 5,212,124 | 5/1993 | Newkirk | 501/88 |
| 5,268,234 | 12/1993 | LaRoche, Jr. | 428/545 |
| 5,306,676 | 4/1994 | Johnson | 501/88 |
| 5,348,760 | 9/1994 | Parker et al. | 427/9 |
| 5,352,529 | 10/1994 | Scanlon et al. | 428/428 |

*Primary Examiner*—Christopher Raimund
*Attorney, Agent, or Firm*—Terry J. Anderson; Karl J. Hoch, Jr.

[57] ABSTRACT

The present invention is a fiber reinforced ceramic matrix composite substrate with an integrated ceramic topcoat layer. The composite substrate is prepared by laminating a preceramic polymer impregnated fiber cloth, curing the laminate, and pyrolyzing the resulting substrate to an initial state. The composite substrate is re-infiltrated with the preceramic polymer, cured, and pyrolyzed to an initial densification level. The topcoat layer is then integrated with the composite substrate by applying transition plies to an exterior surface of the composite substrate, forming a particulate slurry from a ceramic powder and the preceramic resin, and applying the particulate slurry to the transition plies. The transition plies-particulate slurry layup on the composite substrate is autoclave cured and pyrolyzed. The composite substrate is then re-impregnated with the preceramic resin matrix material, cureclave cured, and step pyrolyzed to a desired densification level.

38 Claims, 3 Drawing Sheets

5,902,756

CERAMIC MATRIX COMPOSITES WITH INTEGRATED TOPCOAT LAYERS

BACKGROUND OF THE INVENTION

1. Field of the Invention

The present invention relates in general to ceramic matrix composites, and in particular to ceramic matrix composites with integrated topcoat ceramic layers and the method and process for fabricating the matrix composites with the integrated topcoat layers.

2. Related Art

Composite material systems typically consist of reinforcement materials embedded within a matrix material, and processed to form a matrix composite. The composite consists of reinforcement materials such as particulates, whiskers or fibers embedded in matrix materials such as ceramics, polymers, or metals. The material constituents of matrix composites may be varied to provide tailored properties such as thermal or electrical conductivity, coefficient of thermal expansion, density and mechanical properties.

Ceramic composites are desirable for certain applications due to their light weight, superior thermal properties, and low coefficient of thermal expansion. Also, ceramic composites can be reinforced with fibers to improve mechanical properties, as well as other properties. These reinforced composites are ideal for high temperature strength, low density, and high oxidation resistance. As a result, fiber reinforced ceramic matrix composites have emerged as a promising class of materials for a number of demanding applications in aircraft, missiles and industrial systems.

However, fiber reinforced ceramic matrix composites may require other properties for additional applications. The surface of these composites are typically rough or porous, whereas precise surface features or replicated geometric shapes are desired in some applications. Therefore, to provide these additional uses, what is needed is a fiber reinforced ceramic matrix composite with an integrated topcoat, which imparts additional surface characteristics to the composite. What is further needed is a ceramic topcoat integrated with a ceramic matrix composite substrate that can maintain structural integrity by overcoming effects of thermal expansion mismatch between the topcoat and the substrate during both processing and service.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a composite substrate with an integrated topcoat layer and the method for fabricating the composite substrate and integrated topcoat layer. The composite substrate and topcoat layer are preferably ceramic matrix composites. The topcoat layer comprises a plurality of transition plies, preceramic resin, and preceramic powder.

The composite substrate is fabricated by first impregnating a ceramic fiber cloth with a preceramic polymer precursor, laying-up a composite laminate, autoclave curing, and step pyrolyzing the composite laminate to an initial state to convert the polymeric matrix to ceramic phases. Next, the composite substrate is secondarily treated by reinfiltrating the composite substrate with the preceramic polymer precursor, and re-step curing and re-step pyrolyzing the composite substrate to an initial densification level.

The topcoat layer is then integrated onto the composite substrate by applying transition plies of preceramic polymer prepegged ceramic fiber cloth to an exterior surface of the composite substrate, forming a particulate slurry from the ceramic powder and the preceramic polymer, and applying the particulate slurry to the transition plies. The layup construction is autoclave pressure cured to affect bonding between the topcoat layer and the composite substrate. This is followed by a pyrolyzation cycle for conversion of the polymeric material into a ceramic. The composite part is then re-impregnated with the preceramic polymer, autoclave cured, and step pyrolyzed, several times, to attain a desired densification level.

In an alternative embodiment, a textured surface is created on an exterior surface of the topcoat layer by imprinting a textured tool on the exterior surface after the particulate slurry is applied and before curing of the topcoat layer to thereby exactly replicate the textured tool.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
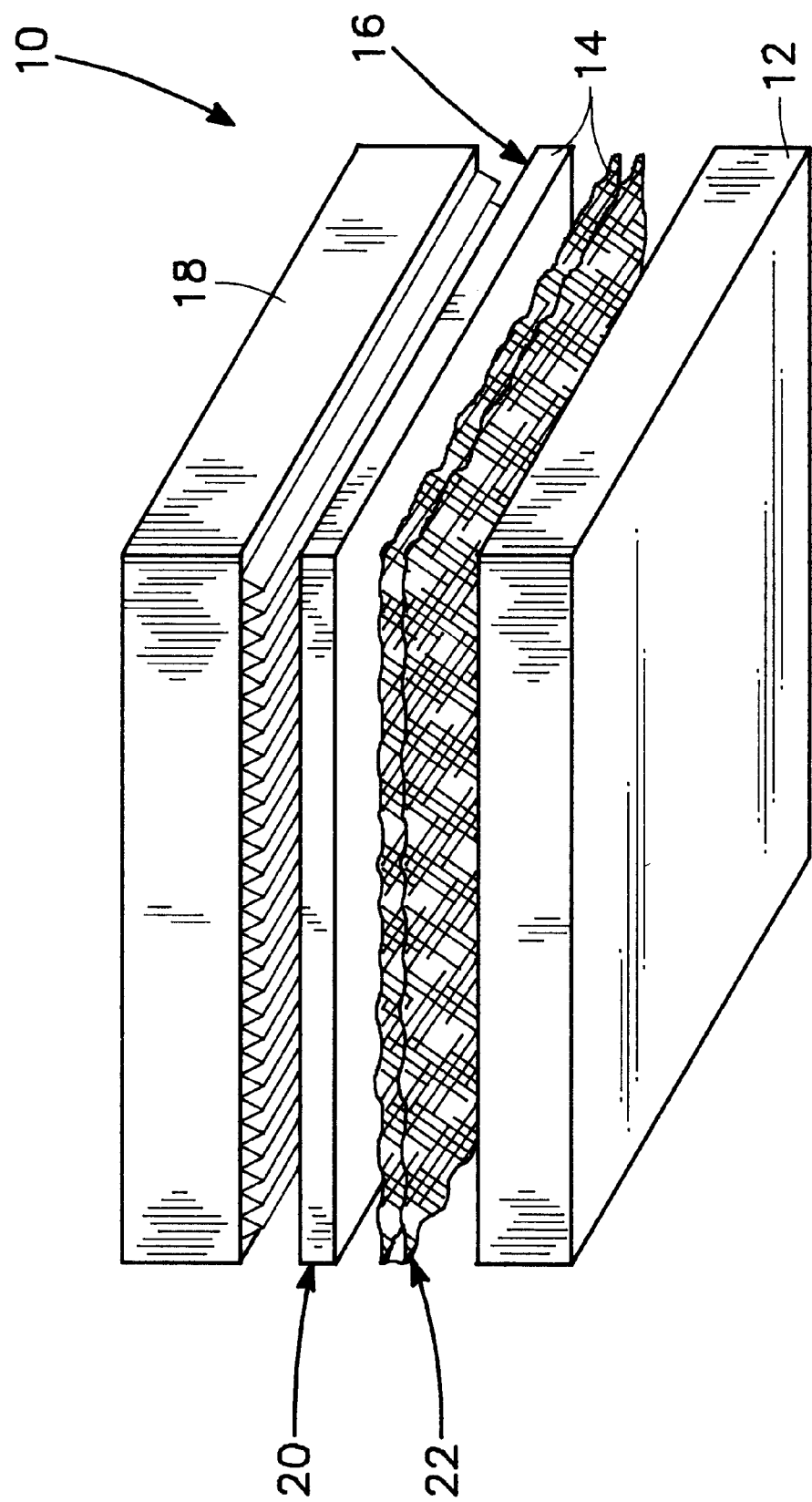
FIG. 1 is a perspective view of the layup assembly consisting of the ceramic composite substrate and the integrated topcoat ceramic layer of the present invention.

FIG. 1 is a perspective view of the ceramic composite substrate with the integrated topcoat layer of the present invention. The present invention is a new ceramic matrix composite 10 comprising a composite substrate 12 with an integrated topcoat exterior surface 14. The topcoat 14 is a crack-free surface layer having a smooth, dense, hard, and textured surface 16. The textured surface 16 is a replicated geometrical surface created with the aid of a replicating tool 18 (described in detail below). The topcoat surface 14 imparts additional characteristics into the composite substrate 12 because it is integrated into the composite substrate 12.

The topcoat layer 14 of the matrix composite 10 is formed from a ceramic particulate slurry 20 and a plurality of transition ceramic fiber cloth plies 22, such as B-stage Blackglas prepegged Nicalon fiber cloth. The particulate slurry 20 is preferably made from a ceramic powder (not shown), such as silicon carbide platelets, and a preceramic resin (not shown), such as a catalyzed Blackglas resin. FIGS. 2–6 describe the fabrication process of the new ceramic matrix composite 10 of the present invention.

Figure 2:
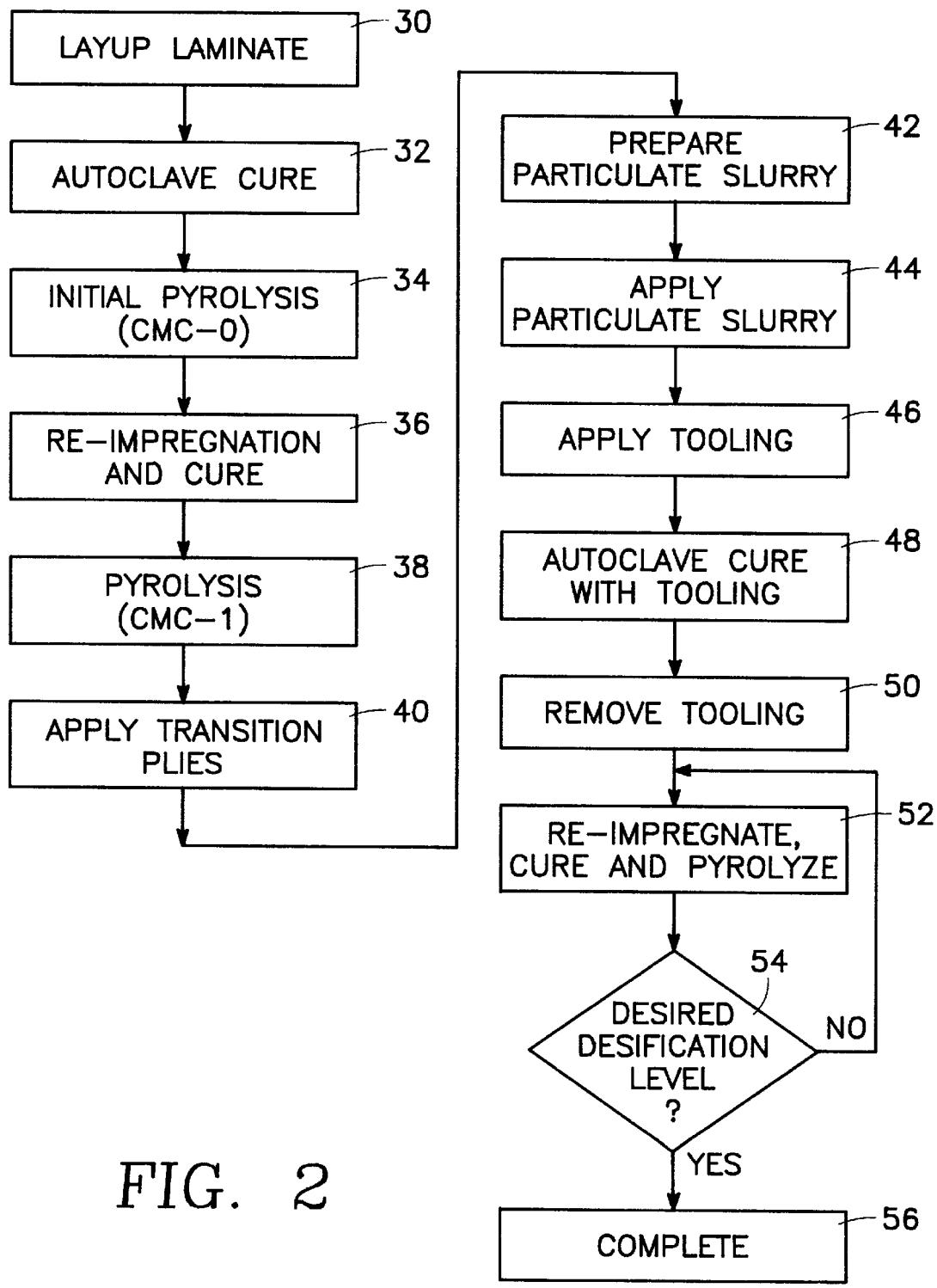
FIG. 2 is a flow chart illustrating the general steps for fabricating the ceramic matrix composite with the integrated topcoat ceramic layer in accordance with the present invention.
Figure 3:
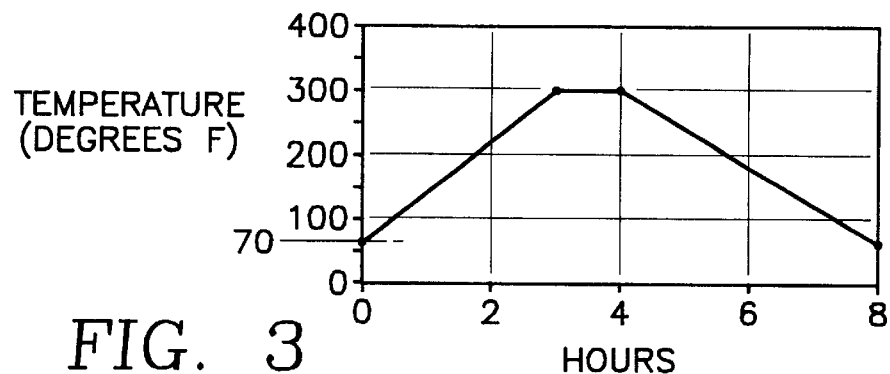
FIG. 3 is a cycle chart illustrating a sample cure cycle used for curing of either the ceramic matrix composite laminate or the topcoat layer layup construction in accordance with the present invention.

FIG. 2 is a flow chart illustrating the general steps for fabricating the matrix composite 10 of FIG. 1 in accordance with the present invention. The ceramic composite substrate 12 is derived by processing desired ceramic fiber cloth and starting matrix materials to an initial state. This is achieved by laying-up a laminate 30 from the preceramic polymer prepegged cloth, vacuum bagging and autoclave curing 32 the laminate, and then pyrolyzing 34 the cured substrate. The substrate is then re-impregnated with the matrix material and cured 36, and pyrolyzed 38 to a CMC-1 state. The transition fiber cloth plies 22 are then applied 40 to an exterior surface of the substrate 12.

Subsequently, the ceramic powder is pretreated and combined with the preceramic polymer to form 42 a particulate slurry, which is then applied 44 to the transition plies 22. The replicating tool 18 can then be applied 46 atop the particulate-filled polymer layer to create a geometrical textured surface 16. The layup with the tooling 18 is vacuum bagged and autoclave cured 48. Last, the replicating tool is removed 50 and the substrate 12 is then repeatedly reinfiltrated with the base matrix material, cured, and pyrolyzed 52 until a desired densification level is reached to complete 56 the fabrication process.

The following is a specific fabrication example for a ceramic matrix composite of the present invention.

Processing the Substrate

Figure 5:
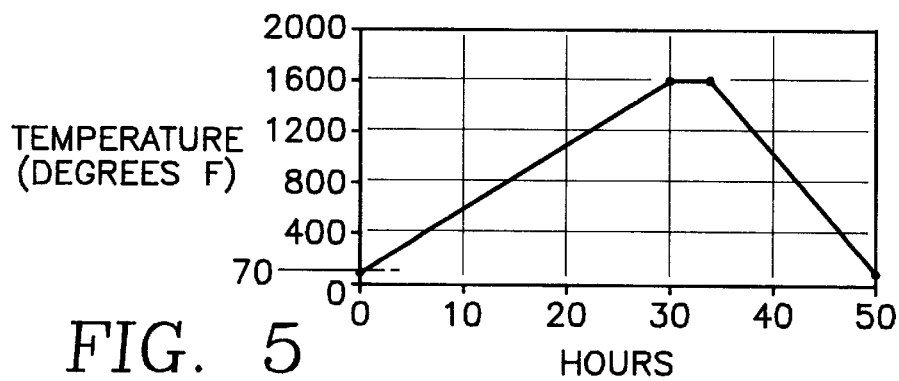
FIG. 5 is a cycle chart illustrating a sample pyrolyzation cycle used for the ceramic matrix composite substrate in accordance with the present invention.

The substrate is first densified to an initial state (CMC-0), with well known substrate fabricating procedures for layup of a laminate, autoclave curing (FIG. 3), and pyrolysis (FIG. 5). For example, layup, autoclave curing, and pyrolysis procedures are described by R. Belardinelli, R. Trice, S. Rangarajan, and R. B. Aswath in Processing of Blackglas Matrix Composites, at the ACerS 97th Annual Meeting & Exposition in Cincinnati, Ohio, on May 2, 1995, which is incorporated herein by reference in its entirety.

Reinfiltrating the Substrate

After the substrate is processed as described above to an initial state of CMC-0, the substrate is reinfiltrated with the base matrix material by submersing the substrate in a preceramic polymer bath. Next, the substrate is removed from the bath and then cured using a three step cycle.

Figure 4:
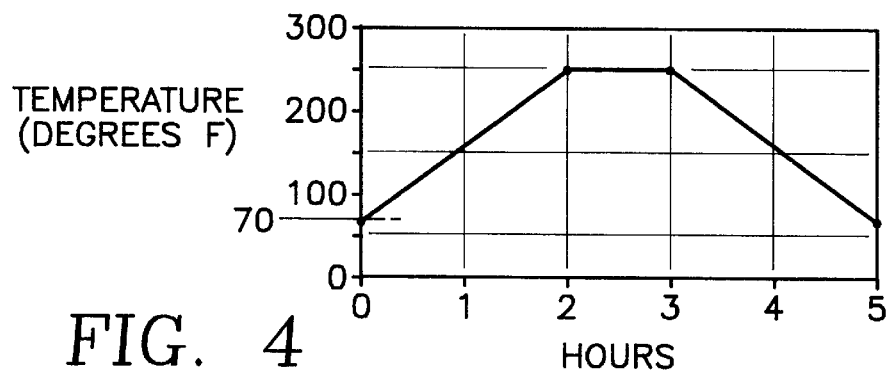
FIG. 4 is a cycle chart illustrating a sample cure cycle used for the ceramic matrix composite with or without the integrated top coat layer after every re-impregnation of the composite with the preceramic polymer.

FIG. 4 is a cycle chart illustrating a sample three step cure cycle used for the ceramic matrix composite substrate in accordance with the present invention. In the first step, the substrate is heated to a maximum temperature of 250 degrees F. within 2 hours in a cureclave under a 80 psi argon gas pressure. During the second step, under a 80 psi argon gas pressure, the substrate is held at the maximum temperature of 250 degrees F. for one hour. In the third step, the substrate is cooled to room temperature in the cureclave in a period of 2 hours.

After the substrate is re-impregnated and cured, the substrate is pyrolyzed to a CMC-1 state with a 48 hour pyrolyzation cycle. FIG. 5 is a cycle chart illustrating a sample pyrolyzation cycle used for the ceramic matrix composite substrate in accordance with the present invention. The substrate is preferably pyrolyzed in a sand sealed steel retort under a continuous flow of argon gas. First, the substrate is heated up to 1600 degrees F. in a 30 hour period. Second, the substrate is held at the maximum temperature of 1600 degrees F. for 3 hours. Next, the substrate is cooled to ambient temperature in a period of 15 hours to complete the cycle. The use of a composite substrate in a relatively porous CMC-1 state for later integration with a topcoat layer will facilitate formation of strong bonds between the substrate and the layer.

Pretreating the Ceramic Powder

Before the ceramic topcoat layer is bonded to and integrated with the substrate, the ceramic powder is pretreated for optimization of dispersion in the binding resin. Since ceramic powders added to a carrier fluid typically agglomerate in solution, proper dispersion of the ceramic powder in the catalyzed polymer solution is essential to achieve increased solids loading and reduced shrinkage during subsequent processing. The average particle size of the silicon carbide platelets is preferably 44 microns. A solution, such as hydrolyzed silane, is used for pretreating the ceramic powder.

The hydrolyzed silane solution is prepared by first mixing 95% by volume ethanol with 5% deionized water. Second, approximately 0.5 ml (three drops) of 0.1 M nitric acid is added to every 100 milliliters of the ethanol/water solution for achieving a pH value of 4. Next, two grams of isobutyltrimethoxysilane is added and mixed into the 100 ml ethanol/water solution (approximately 2% concentration) for approximately five minutes with a magnetic stirrer to form a hydrolyzed silane solution. The hydrolyzed silane solution mixture can pretreat approximately 100 grams of ceramic powder.

The ceramic powder is treated by first mixing the ceramic powder with the hydrolyzed silane solution and ultrasonically agitating the resultant mixture for approximately 30 minutes. The ceramic powder/hydrolyzed silane solution mixture is then placed in a vacuum oven at 230 degrees F. until the ethanol and water is completely removed from the mixture. The resulting preceramic powder is then ground in a mortar and pestle and passed through a −325 mesh nylon screen.

Next, the treated ceramic powder is mixed with a binder resin, such as a catalyzed Blackglas monomer (Allied Signal Blackglas resin solution EMRC 489A). The viscosity of the catalyzed solution is approximately 10 cp. The ceramic powder/catalyzed solution mixture is then subjected to a 20 inch vacuum in a desiccator for approximately 30 minutes. This step removes any air that is trapped in the suspension during the mixing operation. The foregoing pretreatment of the ceramic powder effectively enhances suspension of the ceramic particulates in the catalyzed preceramic polymer solution to produce a uniform slurry or workable filled mixtures with solids loading of up to 54% by volume.

Applying the Transition Plies to the Substrate

Developmental studies leading to this invention have shown that a ceramic filled layer applied directly onto the surface of a ceramic fiber reinforced ceramic matrix composite substrate would crack and separate from the substrate due to differences in thermal expansion characteristics of the two materials. Thus, the transition fiber cloth plies of the topcoat layer are applied to the surface of the composite substrate to form a transition region that accommodates thermal expansion of the materials on both sides.

The transition region consists of preferably three fiber cloth plies. The transition region is utilized to enhance bonding with the substrate and to eliminate surface cracking problems caused by thermal expansion mismatch between the substrate and the topcoat to be integrated with the substrate. The three fiber prepregged cloth plies preferably contain 50% by weight resin content. Each fiber cloth ply is applied to a top surface of the substrate one at a time and vacuum debulked with well known vacuum debulking procedures for approximately 30 minutes to thereby form a bottom ply on the surface of the substrate, a middle ply, and an outside top ply.

Applying the Particulates Slurry to the Plies to Form the Topcoat

The topcoat is formed by applying the particulates slurry to the transition plies. A thin layer of the particulates slurry with a thickness of approximately 20 to 30 mils is spread evenly over the top ply of the transition region. The substrate is then bagged and vacuum debulked with well known vacuum debulking procedures. This allows for compaction of the filled layer and transition plies and for extraction of the solvent in the resin and forces a portion of the excess resin in the plies into the pores of the substrate. Consequently, a strong physical bond is created between the transition region of the topcoat and the substrate upon cure.

Applying Replicating Tool and Curing the Topcoat Layer

During the bagging and vacuum debulking process, a flat tool is applied to the thin layer of particulates slurry to maintain a flat thin layer. The flat tool is then removed and a replicating tool with a particular geometrical textured surface is placed on the filled layer. Before the replicating tool is placed on the filled layer, a non-stick release film, such as Teflon, is applied, for example as a spray, on the textured surface in contact with the filled layer of the layup.

Appropriate tooling is used to control thickness and uniformity of the topcoat. The layup on the substrate is then sealed, bagged, and autoclave cured with the textured tool located atop the filled layer. This allows the topcoat of the substrate to replicate the surface geometrical features of the textured tool. Thus, the topcoat of the substrate can be of numerous different geometric configurations for producing desired results, such as aerodynamic boundary layer control.

The layup on the substrate is sealed, bagged and cured with well known ceramic matrix composite bagging and curing procedures. For example, for the material used as an example in the present description, the topcoat layer can be cured in the autoclave under 60 psi cure pressure and 30" Hg vacuum using the cure cycle of FIG. 3. The cure cycle starts with a heating step, wherein the layup is heated up to 300 degrees F. in three hours. During the second step, the layup is held for one hour at 300 degrees F. In the third step, the layup on the substrate is then furnace cooled to ambient temperature in 4 hours.

Densification of the Substrate

Figure 6:
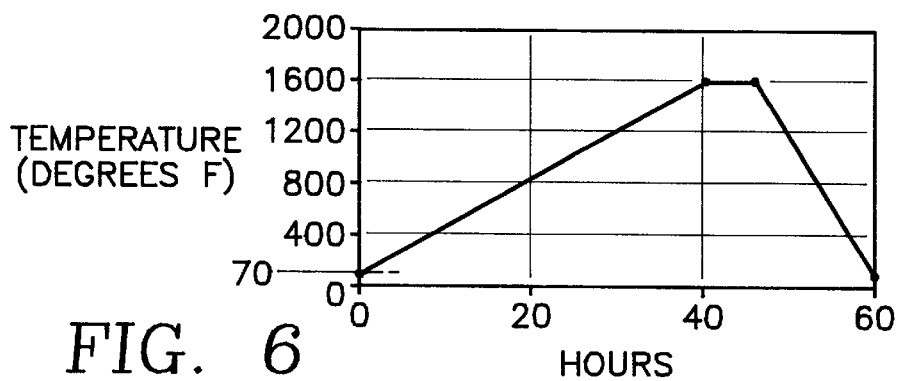
FIG. 6 is a cycle chart illustrating a sample pyrolyzation cycle used for the ceramic matrix composite with the integrated topcoat layer in accordance with the present invention.

The substrate is then pyrolyzed without the replicating tool in a 60 hour pyrolyzation cycle as shown in FIG. 6. The cycle consists of a gradual 41 hour heatup step to a maximum temperature of 1600 degrees F., a 4 hour hold period at the maximum temperature of 1600 degrees F., and a gradual cooldown step of 15 hours.

Reinfiltration with preceramic resin, curing (FIG. 4), and pyrolyzation (FIG. 6) is repeated until the substrate is fully densified. Full densification is typically achieved at CMC-4 (reinfiltrating, curing, and pyrolyzing the substrate three additional times after CMC-1). However, the substrate may be reinfiltrated, cured, and pyrolyzed past CMC-4 depending on the application. In addition to fully densifying the substrate, repeated densification processing enhances the bond between the substrate and the ceramic powder filled layer and the transition plies of the topcoat.

Applications

Numerous structures for defense and commercial applications can utilize the new ceramic matrix composite with the integrated topcoat. These applications include flow control on a hot structure, wear/erosion resistant components, ballistic protection, stealth applications, thermally controlled coatings (diamond fillers), reflective surfaces, corrosion resistant heat exchangers and flues, and secondary attachments.

The new ceramic matrix composite with topcoat is ideal for the above applications because it can withstand thermal expansion mismatch effects. This is because the topcoat is fully integrated into the ceramic matrix composite. Thus, spalling, cracking, delamination, or separation of component constituents is prevented during the operation of structures employing the ceramic matrix composite with topcoat in extreme thermo/acoustic environments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An article comprising:
    a ceramic composite substrate derived by (a) fabricating said composite substrate by impregnating ceramic fiber cloth with a preceramic resin matrix material, laying-up a composite laminate, autoclave curing said composite laminate, and step pyrolyzing said composite substrate to an initial state, and (b) secondarily processing said composite substrate by re-impregnating said composite substrate with said preceramic resin matrix material, re-step curing said composite substrate, and re-step pyrolyzing said composite substrate to an initial densification level; and
    a ceramic topcoat layer integrated with said composite substrate derived by (a) applying a plurality of transition ceramic fiber cloth plies to an exterior surface of said composite substrate, (b) forming a particulate slurry from a ceramic powder and a preceramic resin, (c) applying said particulate slurry to said plurality of transition plies, (d) processing said ceramic topcoat layer on said composite substrate by autoclave curing said composite substrate and pyrolyzing said composite substrate, and (e) re-impregnating said composite substrate with said matrix material, cureclave curing said substrate composite, and step pyrolyzing said substrate composite to a desired densification level.

2. The article of claim 1, further comprising a textured exterior surface on said topcoat derived by imprinting a replicating tool on said exterior surface of said topcoat after said particulate slurry is applied and before curing said topcoat on said composite substrate to thereby exactly replicate the texture of said tool.

3. The article of claim 1, wherein said composite substrate is initially processed without said topcoat two times to a CMC-1 state.

4. The article of claim 1, wherein said composite substrate integrated with said topcoat layer is re-infiltrated four times to a CMC-4 state.

5. The article of claim 1, wherein said composite substrate integrated with said topcoat layer is re-infiltrated five times to a CMC-5 state.

6. The article of claim 1, wherein said composite substrate is processed to a 95 percent densification level.

7. The article of claim 1, wherein three transition ceramic fiber cloth plies are applied to the exterior surface of said composite substrate.

8. The article of claim 1, wherein said preceramic resin is a catalyzed monomer resin.

9. The article of claim 1, wherein said ceramic fiber cloth plies are silicon-carboxyl resin prepegged silicon carbide fiber cloth plies.

10. The article of claim 8, wherein said preceramic resin is a silicon-carboxyl resin.

11. The article of claim 10, wherein said ceramic matrix composite is fiber reinforced silicon-carboxyl resin matrix composite.

12. The article of claim 1, wherein said ceramic powder is silicon carbide platelets.

13. A ceramic composite comprising:
   a composite substrate comprised of an impregnated ceramic fiber cloth with a preceramic resin matrix material in a converted ceramic state; and
   a ceramic topcoat layer integrated with an exterior surface of said composite substrate, wherein said ceramic topcoat layer is integrated with said composite substrate while said preceramic resin matrix is in said converted ceramic state, and wherein said ceramic topcoat layer is comprised of a plurality of transition plies and a particulate slurry integrated with said transition plies, wherein said particulate slurry is formed from a ceramic powder and a preceramic resin.

14. The invention as set forth in claim 13, further comprising a textured exterior surface imprinted on said topcoat layer.

15. The invention as set forth in claim 13, wherein three transition ceramic fiber cloth plies are located on the exterior surface of said composite substrate.

16. The invention as set forth in claim 13, wherein said preceramic resin is a catalyzed monomer resin.

17. The invention as set forth in claim 13, wherein said ceramic fiber cloth plies are silicon-carboxyl resin prepegged silicon carbide fiber cloth plies.

18. The invention as set forth in claim 13, wherein said matrix material is a fiber reinforced silicon-carboxyl resin matrix composite.

19. The invention as set forth in claim 13, wherein said ceramic powder is silicon carbide platelets.

20. A process for integrating a ceramic topcoat layer with a composite substrate, comprising the steps of:

(a) fabricating said composite substrate comprising the sub-steps of:
   (1) impregnating ceramic fiber cloth with a preceramic resin matrix material,
   (2) laying-up a composite laminate,
   (3) autoclave curing said composite laminate, and
   (4) step pyrolyzing said composite substrate to an initial state,
(b) secondarily processing said composite substrate comprising the sub-steps of:
   (1) re-impregnating said composite substrate with said preceramic resin matrix material,
   (2) re-step curing said composite substrate, and
   (3) re-step pyrolyzing said composite substrate to an initial densification level; and
(c) applying a plurality of transition ceramic fiber cloth plies to an exterior surface of said composite substrate;
(d) forming a particulate slurry from a ceramic powder and a preceramic resin;
(e) applying said particulate slurry to said plurality of transition ceramic fiber cloth plies;
(f) processing said ceramic topcoat layer on said composite substrate by autoclave curing said composite substrate and pyrolyzing said composite substrate;
(g) re-impregnating said composite substrate with said preceramic resin matrix material;
(h) cureclave curing said substrate composite; and
(i) step pyrolyzing said substrate composite to a desired densification level.

21. The invention as set forth in claim 20, further comprising the step of:
   imprinting a textured exterior surface on said topcoat after said particulate slurry is applied and before curing said topcoat on said composite substrate.

22. The invention as set forth in claim 20, wherein said composite substrate is initially processed without said topcoat two times to a CMC-1 state.

23. The invention as set forth in claim 20, wherein said composite substrate integrated with said topcoat layer is re-infiltrated four times to a CMC-4 state.

24. The invention as set forth in claim 20, wherein said composite substrate integrated with said topcoat layer is reinfiltrated five times to a CMC-5 state.

25. The invention as set forth in claim 20, wherein said composite substrate is processed to a 95 percent densification level.

26. The invention as set forth in claim 20, wherein three transition ceramic fiber cloth plies are applied to the exterior surface of said composite substrate.

27. An article comprising:
   a ceramic composite substrate derived by (a) fabricating said composite substrate by impregnating ceramic fiber cloth with a preceramic resin matrix material, laying-up a composite laminate, autoclave curing said composite laminate, and step pyrolyzing said composite substrate to an initial densification level; and
   a ceramic topcoat layer integrated with said composite substrate derived by (a) applying a plurality of transition plies to an exterior surface of said composite substrate, (b) forming a particulate slurry from a ceramic powder and a preceramic resin, (c) applying said particulate slurry to said plurality of transition plies, (d) processing said ceramic topcoat layer on said composite substrate by autoclave curing said composite substrate and pyrolyzing said composite substrate, and (e) re-impregnating said composite substrate with said preceramic resin matrix material, cureclave curing said substrate composite, and step pyrolyzing said substrate composite to a desired densification level.

28. (New) The article of claim 27, further comprising a textured exterior surface on said topcoat derived by imprinting a replicating tool on said exterior surface of said topcoat after said particulate slurry is applied and before curing said topcoat on said composite substrate, wherein the texture of said tool is replicated on said exterior surface.

29. The article of claim 27, wherein said composite substrate is processed to a 95 percent densification level.

30. The article of claim 27, wherein said preceramic resin is a catalyzed monomer resin.

31. The article of claim 27, wherein said plurality of transition plies are impregnated with 50% by weight resin content.

32. The article of claim 31, wherein said ceramic fiber cloth plies are silicon-carboxyl resin prepegged silicon carbide fiber cloth plies.

33. The article of claim 27, wherein said composite substrate is a fiber reinforced ceramic matrix composite substrate.

34. The article of claim 27, wherein said ceramic matrix composite is fiber reinforced silicon-carboxyl resin matrix composite.

35. The article of claim 27, wherein said ceramic powder is silicon carbide platelets.

36. A process for integrating a ceramic topcoat layer with a composite substrate, comprising the steps of:

(a) fabricating said composite substrate comprising the sub-steps of:

(1) impregnating ceramic fiber cloth with a preceramic resin matrix material, (2) laying-up a composite laminate, (3) autoclave curing said composite laminate, and (4) step pyrolyzing said composite substrate to an initial state, (b) applying a plurality of transition plies to an exterior surface of said composite substrate;

(c) forming a particulate slurry from a ceramic powder and a preceramic resin;

(d) applying said particulate slurry to said plurality of transition plies;

(e) processing said ceramic topcoat layer on said composite substrate by autoclave curing said composite substrate and pyrolyzing said composite substrate;

(f) cureclave curing said substrate composite; and (g) step pyrolyzing said substrate composite to a desired densification level.

37. The invention as set forth in claim 36, further comprising the step of:

imprinting a textured exterior surface on said topcoat after said particulate slurry is applied and before curing said topcoat on said composite substrate.

38. The invention as set forth in claim 36, wherein said composite substrate is processed to a 95 percent densification level.

\* \* \* \* \*